United States Patent Office 3,444,838
Patented May 20, 1969

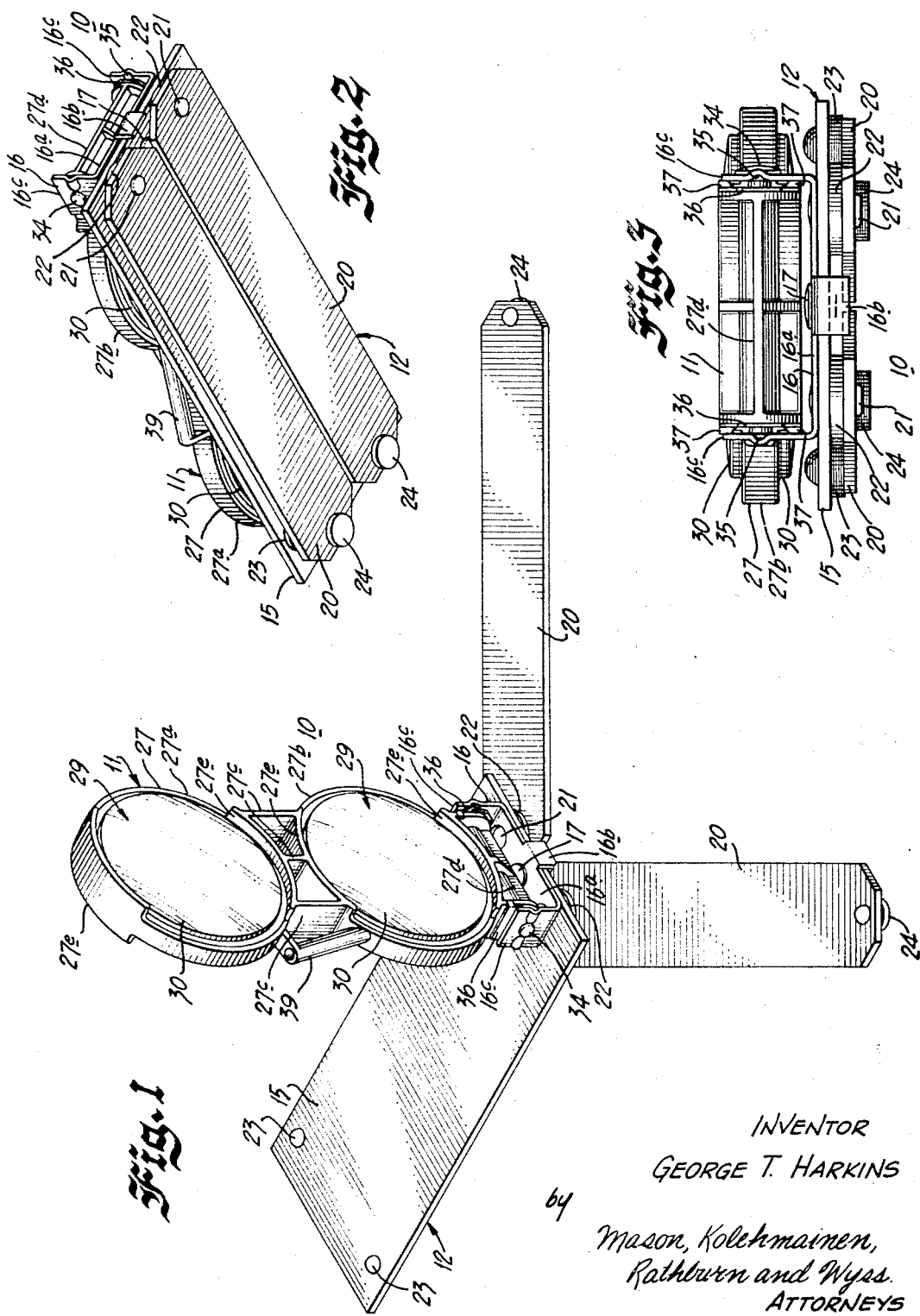

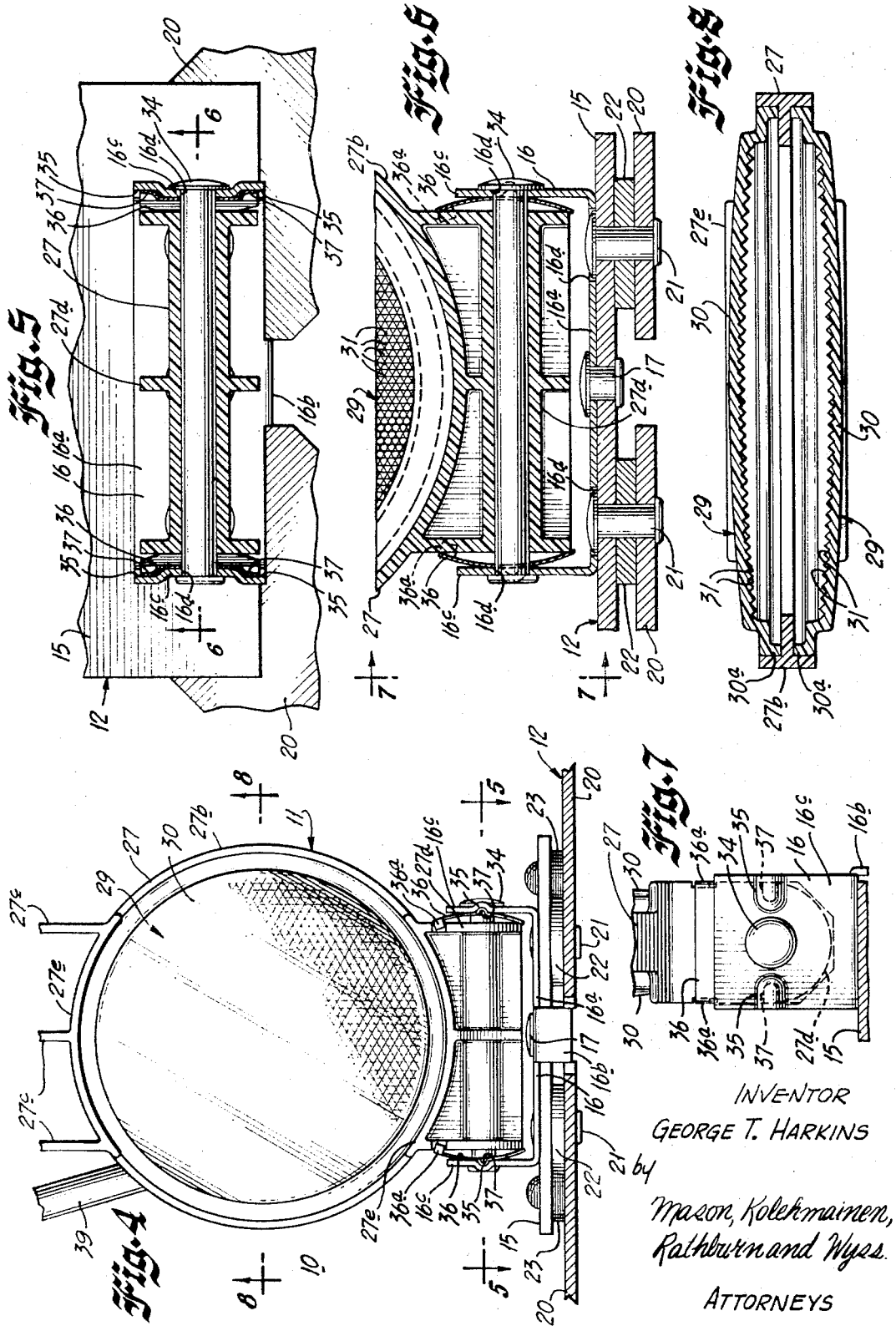

3,444,838
HIGHWAY WARNING SIGNAL
George T. Harkins, Wichita, Kans., assignor to Miro-Flex Company, Inc., Wichita, Kans., a corporation of Kansas
Filed Dec. 15, 1965, Ser. No. 513,928
Int. Cl. E01f 9/04
U.S. Cl. 116—63   4 Claims

ABSTRACT OF THE DISCLOSURE

A signal flare for highway use and the like includes a base and a pair of support legs, with a hinged support yoke carrying a pair of axially spaced apart reflecting lenses having reflecting surfaces on their confronting faces. The yoke is hermetically sealed to close the space between the lenses.

---

This invention relates to portable reflecting signal flares of the type used on airplane runways and ramps and/or highways, particularly by motorists in emergencies. The flares have reflecting lenses which are visible at long distances.

Portable signal flares are desirable for use along aircraft runways and ramps to help in directing airplane traffic. Moreover signal flares are commonly carried by private vehicular and commercial truck traffic. The nature of their use requires compactness when stored, stability when being used, ease of placing in an upright position, and the ability to withstand adverse weather conditions.

In order to obtain maximum distances of visibility for the signal flares, the signal flares may include sets of lenses of one or more pairs of axially spaced reflecting lenses, generally convex on their outer surfaces and provided with reflecting prisms on their confronting inner surfaces to define light directing structure. One difficulty heretofore experienced with the use of such spaced lenses is that their inner surface loses its reflective properties when exposed to adverse weather conditions. It is required that the signal flare, in order to be acceptable under present Air Force regulations for use on military airfields, have hermetically sealed lenses so that the space between the lenses is effectively sealed from the weather.

It is accordingly an object of the present invention to provide an improved signal flare which overcomes the above mentioned difficulties.

Another object of the present invention is to provide an improved signal flare having an improved supporting base.

Yet another object of the present invention is to provide an improved signal flare having an improved pivotal connection between the reflector assembly and the base thereof.

Yet another object of the present invention is to provide an improved signal flare of the type having spaced lenses wherein the space between the lenses is effectively hermetically sealed.

Yet another object of the present invention is the provision of an improved one-piece plastic yoke that not only supports the lenses but also is part of the hinge, has a unitary flag holder, and is shaped so that the lenses are protected when the signal flare is closed.

Further objects and advantages of the present invention will become apparent as the following description proceeds and the features of novelty which characterize the invention will be pointed out with particularity in the claims annexed to and forming a part of this specification.

In accordance with these and other objects, there is provided an improved signal flare including a base and an upwardly extending reflector assembly connected to the base. The reflector assembly includes a pair of axially spaced reflecting lenses and a yoke which supports the lenses from the base. The lenses are received in a yoke ring and are hermetically sealed therewith to completely enclose the space between the lenses. In a preferred embodiment of the invention the lens and supporting yoke are each formed of suitable plastic and fused together. Ultrasonic energy provides a satisfactory method of fusing the components.

In accordance with another feature of the present invention, there is provided improved means for hingedly connecting supporting legs to the supporting plate, improved means for pivotally connecting the reflector assembly to the base, and improved latch means for latching the reflector assembly in an upright position on the base.

In accordance with yet another feature of the present invention, the yoke is formed of one piece of plastic that not only supports and seals the lenses but also is part of the hinge, has a unitary flag holder, and is shaped with projections which extend beyond the convex surface of the lenses to protect the signal flare when the flare is closed.

For a better understanding of the present invention reference may be had to the accompanying drawings wherein:

FIG. 1 is a perspective view of the signal flare in an unfolded position and ready for use in accordance with the present invention;

FIG. 2 is a bottom perspective view of the signal flare of FIG. 1, illustrated in a folded position;

FIG. 3 is an end view of the folded signal flare of FIG. 2.

FIG. 4 is a fragmentary end view of the signal flare of FIG. 1, illustrated in the unfolded position, and drawn to a larger scale;

FIG. 5 is a fragmentary cross sectional view of the signal flare of FIG. 1, taken along line 5—5 of FIG. 4, and illustrating the hinge connection between the reflector assembly and the base;

FIG. 6 is a fragmentary cross sectional view of the signal flare of FIG. 1, taken along line 6—6 of FIG. 5, and further illustrating the hinge assembly;

FIG. 7 is a fragmentary detail view of a portion of the hinge, taken along line 7—7 of FIG. 6; and FIG. 8 is a fragmentary cross sectional view of the signal flare illustrating a pair of lenses assembled in the yoke and taken along line 8—8 of FIG. 4.

Referring now to the illustrated embodiment, there is provided an improved signal flare 10 in accordance with the present invention and including a reflector assembly 11 pivotally connected to a base or support 12. The base 12 is of the foldable type to permit the signal flare 10 to be stored in a minimum space and to provide maximum stability to the signal flare when it is in use. More specifically the base 12 includes a supporting plate 15 to which is secured a generally U-shaped hinge member 16 adjacent one edge thereof. A rivet 17 extends through the bight portion 16a of the hinge member 16 intermediate the ends thereof and through the supporting plate 15 to secure the hinge member to the plate. Additionally a downwardly extending tab 16b integrally formed with the bight portion 16a positions the hinge member 16 relative to the plate 15.

To provide further stability to the signal flare, the base 12 includes a pair of foldable support legs 20 each pivotally mounted to the plate 15 by a pivot pin 21, best illustrated in FIG. 6, and spaced from the plate 15 by a spacer washer 22. The downwardly extending tab 16b defines a stop for the support blades 20 in their open position.

Moreover the bight portion 16a is provided with apertures 16d, FIG. 6, to provide clearance for the heads of the pivot pins 15.

To provide a nonskid bearing for the supporting plate 15 and legs 20, the plate 15 is provided with removable resilient feet 23 and each of the support legs 20 is provided with a removable resilient foot 24. The removable feet 23 additionally serve to frictionally lock the support legs 20 in their folded position.

Referring now to the reflector assembly 11, the reflector assembly 11 includes a unitary one-piece yoke or frame 27 of suitable material such as ABS (acrylonitrile butadiene styrene). To support a pair of vertically spaced lens assemblies 29, formed of suitable plastic material such as acrylic resin, the yoke 27 is formed with vertically spaced yoke rings 27a, 27b interconnected with vertical webs 27c.

To provide optimum reflection for the reflector assembly 11, each of the lens assemblies 29 includes a pair of axially spaced reflecting lenses 30, FIG. 8, each provided with light directing prisms 31 on their inner surface.

In order to hermetically seal the space between the reflecting lenses 30, the yoke rings 27a, 27b are of generally T-shape cross section, as best illustrated in FIG. 8, and the reflecting lenses 30 are provided with inwardly extending edge flanges 30a hermetically sealed to the inner surface of the yoke rings 27a, 27b. The reflecting lenses 30 may be fused to the yoke 27 in any suitable manner, as by subjecting the reflector assembly 11 to suitably directly ultrasonic energy in the range of 20 kilocycles.

For hingedly supporting the reflector assembly, there is provided a hinge pin 34 extending through upwardly extending legs 16c of the hinge member 16 and through a lower integral portion 27d of the yoke 27 to define a hinge.

To provide for latching the reflector assembly 11 in an upwardly extending position, the legs 16c of the hinge member 16 are provided with opposed recesses or grooves 35 on their inner surface, and a pair of opposed leaf springs 36 secured to the portion 27b of the yoke 27 by suitable tabs or projections 36a are provided with outwardly extending ridges or detents 37 which snap into the grooves 35 when the reflector assembly 11 is opened upright relative to the base 12.

The yoke 27 of the reflector assembly 11 is provided with an angularly extending flag holder 39 formed integrally with the remainder of the yoke 27 and spaced between the lens assemblies 29 outwardly of the webs 27c in the yoke.

To provide for protecting the lens 30 when the signal flare 10 is folded, or when the folded signal flares 10 are stacked one on top of each other, the yoke 27 is provided with axially extending projecting arcuate portions 27e extending axially beyond the outermost portion of the convex lenses 30.

From the above detailed description, it will be seen that the lenses of the present signal flare are effectively hermetically sealed to the yoke. The one-piece plastic yoke not only supports the lens, but also is part of the hinge, has a flag holder and is shaped so that the lenses are protected when the flare is closed. The hinge and flat spring arrangement provide an improved latching mechanism for holding the flange in an upright position. Moreover the turned down tab of the hinge member serves as a stop for the narrow support legs.

Although the present invention has been described by reference to only a single embodiment thereof, it will be apparent that numerous other modifications and embodiments may be devised by those skilled in the art.

What is claimed as new and desired to be secured by Letters Patent of the United States is:

1. A signal flare including a base and an upwardly extending reflector assembly connected to said base, said reflector assembly including a pair of axially spaced apart reflecting lenses having reflecting surfaces on their confronting faces and a yoke supporting said lenses from said base and including a yoke ring receiving said lens, said lenses being hermetically sealed with said yoke ring to hermetically enclose the space between the lenses.

2. A signal flare as set forth in claim 1 above wherein said reflector assembly includes two vertically displaced pairs of said lenses, and said yoke includes two yoke rings, each ring receiving one pair of said lenses.

3. A signal flare as set forth in claim 1 above wherein said yoke and said lenses are of plastic, and are fused together to provide the hermetic seal.

4. A signal flare comprising a base defining a support including a supporting plate, a generally U-shaped hinge member secured to said plate adjacent an edge thereof, fastening means extending through the bight portion of said hinge member intermediate the ends thereof and though said plate to secure said hinge member to said plate, a pair of support legs, hinge means including spaced pivot pins extending through said plate adjacent said edge thereof and defining respective pivots for said support legs adjacent the ends of the respective legs, a foldable reflector assembly, a hinge pin extending between the legs of said U-shaped hinge member and through a portion of said reflector assembly, a downwardly extending tab from said bight portion defining a stop at the open position of said supporting legs; said legs of said U-shaped hinge member being provided with opposed transverse grooves on their inner surface; and a pair of leaf springs mounted on opposed ends of said portion and provided with transverse outwardly extending ridges latchable in said grooves when said reflector assembly is open.

References Cited

UNITED STATES PATENTS

| 3,077,852 | 2/1963 | Gunderson | 116—63 |
| 3,077,853 | 2/1963 | Gunderson | 116—63 |
| 3,123,041 | 3/1964 | Gunderson | 116—63 |
| 3,253,570 | 5/1966 | Gunderson | 116—63 |
| 3,292,569 | 12/1966 | Trigilio | 116—63 |

FOREIGN PATENTS

| 703,684 | 2/1954 | Great Britain. |
| 708,492 | 7/1958 | Canada. |
| 714,429 | 7/1965 | Canada. |

LOUIS R. PRINCE, *Primary Examiner.*

JOSEPH W. ROSKOS, *Assistant Examiner.*